March 25, 1930.  J. W. T. ELLIOT  1,751,687
LUBRICATING DEVICE
Filed Dec. 22, 1927   2 Sheets-Sheet 1

INVENTOR
JOHN.W.T.ELLIOT
BY Fetherstonhaugh & Co
ATTORNEYS

March 25, 1930.  J. W. T. ELLIOT  1,751,687
LUBRICATING DEVICE
Filed Dec. 22, 1927  2 Sheets-Sheet 2

INVENTOR
JOHN.W.T.ELLIOT
BY Fetherstonhaugh&Co
ATTORNEYS

Patented Mar. 25, 1930

1,751,687

UNITED STATES PATENT OFFICE

JOHN W. T. ELLIOT, OF ALLANDALE, ONTARIO, CANADA

LUBRICATING DEVICE

Application filed December 22, 1927. Serial No. 241,964.

This invention relates to new and useful improvements in lubricating devices and particularly to devices for lubricating bearings which are slidably mounted in guides.

The object of the invention is to provide a simple and efficient lubricator which will utilize the relative movement between a fixed and a moving body to force lubricant to the friction surfaces.

Another object is to provide a lubricator which may be quickly adjusted and easily attached to a fixed and a moving body to lubricate the frictionally engaging surfaces of both bodies.

A further object is to provide a flexible lubricator which will be automatic in its operation and which will be easily accessible for filling, cleaning and repairs.

According to my invention I provide a telescopic lubricator having one end secured to a journal box, or the like, and the other end secured to the frame or other fixed portion of the bogie. The lubricator comprises a plurality of tubular elements slidably mounted one within the other, with the smaller tube acting as a piston to force lubricant from the discharge end of the lubricator, said discharge end communicating through channels to the friction surfaces between the box and the frame, or with a wedge between said surfaces, or with the rubbing surfaces of the journal and the bushing mounted in the box. Suitable valves are provided for directing the pressure towards the outlet and preventing any back pressures within the lubricator.

In the drawings which illustrate my invention :—

Figure 1:
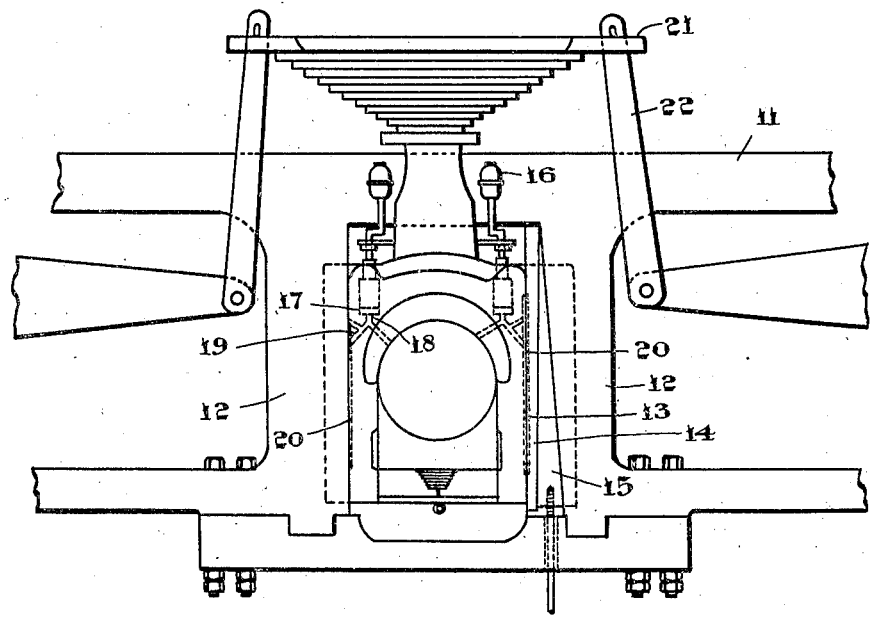
Figure 1 is a side elevation of a bearing with my improved lubricator mounted therein.
Figure 3:
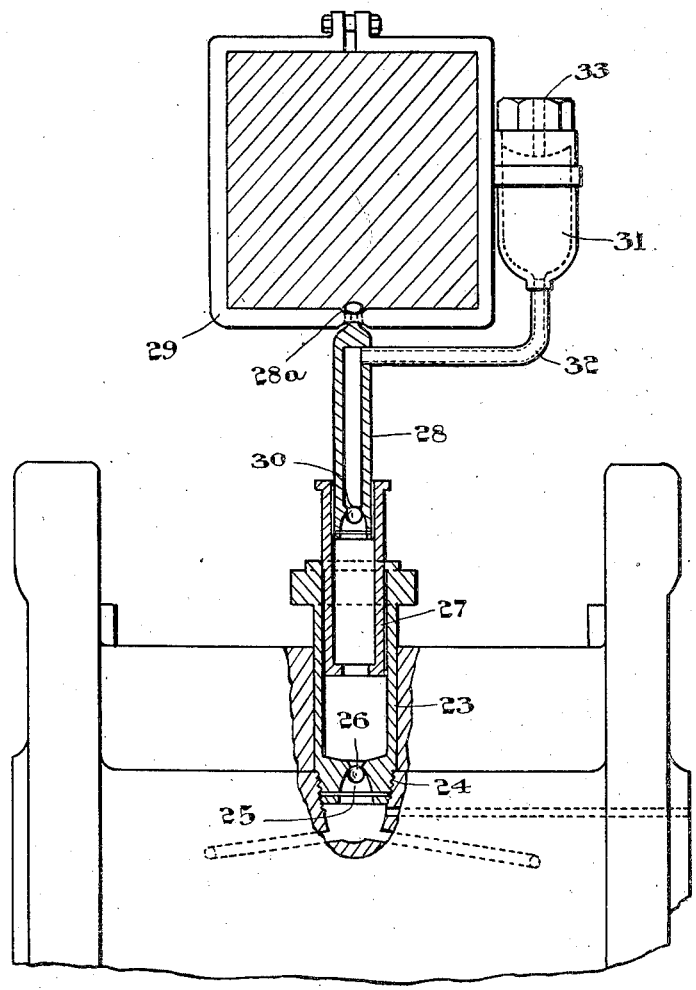
Figure 3 is a part sectional end elevation of a bearing with a modified type of lubricator.

Referring more particularly to the drawings, 11 designates part of a bogie frame of a locomotive which is provided with guides 12, within which is slidably mounted the journal bearing 13. Between one of the guides and the bearing a floating wedge 14 and an adjustable wedge 15 may be mounted, as shown in Figure 1. To force lubricant between the guide, the wedges, and the bearing, on one side and between the bearings and the guide on the other side, I mount lubricators 16 in the bearings. The lubricators are fitted into recesses 17 and their discharge ends or openings 18 communicate with oil channels 19 and grooves 20, the latter being formed in the bearing sides and in the wedges. The bearings contact with spring saddles 21 which may be connected to links 22 and equalizer beams in the usual manner. The lubricator construction is preferably made in the manner disclosed in Figure 3, and is made collapsible or telescopic. The lubricator consists of a plurality of tubes, three are shown for illustrative purposes only and may be modified, if so desired. The larger tube 23 is provided with an externally threaded projection 24 which may be screwed into the bearing. This projection is provided with an outlet 25 and a one-way valve 26 of any desired form. Slidably mounted in the tube 23 is the slightly smaller tube 27 and a suitable oil or grease-tight sliding joint may be made between the tubes. A smaller tube 28 is slidably mounted in the tube 27 and a suitable oil-tight joint may be made between the tubes. The upper end of the tube 28 may be closed and may be connected by a ball projection 28ª to the frame by means of a strap 29. The lower end of the smaller tube or feed chamber is provided with a one-way valve 30. Secured to the frame by any suitable means is the oil supply tank 31, which communicates with the feed chamber through the pipe 32. A suitable cap 33 may be secured to the tank 31. The grease is delivered to the feed chamber and is forced to the friction surfaces by the relative movement of the tubes. The valve in the smallest tube is closed in its downward stroke and acts as a forcing piston to force the lubricant through the opening in the largest tube. On its upward stroke the valve in the smaller tube is opened to allow the grease to flow downwardly towards the lower tubes. The lower valve closes on the upward stroke due to suction and is opened by the force exerted by the downward movement of the piston.

Figure 2:
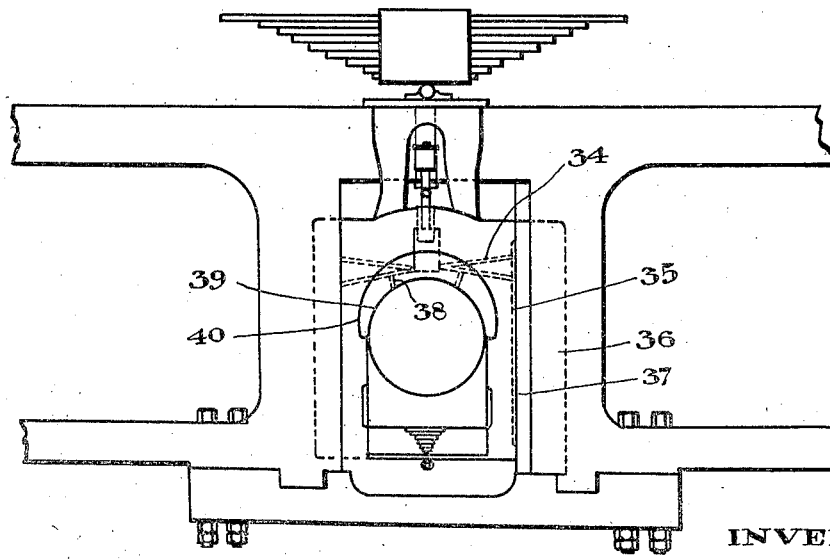
Figure 2 is a side elevation of a bearing with a modified type of lubricator.

In Figure 2 a single lubricator is used to force the lubricant through the channels 34 and grooves 35, towards the friction surfaces between the guide 36 and the sides of the bearing 37, and suitable channels 38 may be made in the bearing to carry grease to the surface between the journal 39 and the bushing 40. It will be seen that by forming other channels, the lubricant may be forced to any friction surfaces of the bearing. By making the lubricator collapsible, it will be seen that the journal box may be jacked up for brass changing without distorting or even interfering with the lubricator mechanism. The feed to the lubricator is automatic and will operate equally well with grease or oil. The piston part of the lubricator is secured to the frame which moves up and down on the bearing and this relative movement is utilized to force the lubricant to the friction surfaces.

Having thus described my invention, what I claim is:—

1. The combination with a locomotive frame and a journal box mounted to slide vertically in suitable guides carried by the frame of a telescopic lubricator comprising a plurality of tubes slidably mounted one within the other, one of said tubes being provided with an apertured outlet and another of the tubes being provided with a valve which, when closed, forms a piston, the first mentioned tube being fixed to said bearing and the second mentioned tube being fixed to the frame, the arrangement being such that the second mentioned tube which functions as a piston is moved downwardly on the power stroke by the weight of the frame.

2. The combination with a locomotive frame and a journal bearing mounted to slide vertically between suitable guides carried by the frame of a telescopic lubricator comprising a plurality of vertically extending tubes mounted one within the other, the largest of said tubes being secured to the bearing to move vertically therewith and provided with a restricted discharge opening and the smallest of said tubes being secured to the frame to move vertically therewith and provided with a valve adapted to close when the valve is pressed towards the discharge opening.

3. The combination with a locomotive frame and a journal bearing mounted to slide vertically between suitable guides carried by the frame of a telescopic lubricator comprising a plurality of tubes slidably connected together, the larger of said tubes being provided with a restricted lubricant discharge opening and being secured to the bearing to move vertically therewith, the smallest tube being closed at one end and provided with a one-way valve adapted to close on its downward stroke to force lubricant through a one-way valve in the discharge opening, said last mentioned tube being secured to the frame to move vertically therewith.

4. The combination with a locomotive frame and a journal bearing mounted to slide vertically between suitable guides carried by the frame of a telescopic lubricator comprising a plurality of vertically extending tubes slidably mounted one within the other, the largest of said tubes being secured to the journal bearing and provided with a valved discharge opening and the smallest tube being secured to the locomotive frame and also provided with a valved opening, said smallest tube being closed at its upper end to form a chamber, and a feed cup carried by said bearing and having an outlet pipe connected to said chamber.

5. A telescopic lubricator for mounting between a fixed body and a moving body, said lubricator comprising a large tube having a restricted opening communicating with oil channels leading to the friction surfaces of the fixed body, a small tube secured to the moving body, said small tube being closed at one end and provided with a valved opening at the other end forming an oil receiving chamber, a feed cup communicating with said feed chamber, and intermediate tubes slidably connected to the small and the large tubes to allow telescopic movement between the tubes due to the relative movement between the fixed and the moving bodies.

6. A telescopic lubricator for mounting between a fixed and a moving body, said lubricator comprising a plurality of tubes slidably connected together, the largest of said tubes being secured to the fixed body and communicating through a valve opening with oil channels formed in said fixed body, the smallest of said tubes being closed at one end and provided with a valved opening at the other end to form a feed chamber, an oil reservoir communicating with said chamber, said smaller tube being connected to the moving body.

7. A telescopic lubricator according to claim 6 having a universal connection between the moving body and the smallest tube.

In witness whereof I have hereunto set my hand.

JOHN W. T. ELLIOT.